Sept. 22, 1964 G. BIRKBECK 3,149,401

APPARATUS FOR AUTOMATIC MOUNTING OF ELECTRONIC COMPONENTS

Filed March 6, 1958

INVENTOR
GUY BIRKBECK
BY
Frank R. Jirafai
AGENT

United States Patent Office 3,149,401
Patented Sept. 22, 1964

3,149,401
APPARATUS FOR AUTOMATIC MOUNTING OF ELECTRONIC COMPONENTS

Guy Birkbeck, Winslade, England, assignor to North American Philips Company Inc., New York, N.Y.
Filed Mar. 6, 1958, Ser. No. 719,558
Claims priority, application Great Britain Mar. 7, 1957
6 Claims. (Cl. 29—33)

The present invention relates to an improved apparatus and/or method for affixing electric components.

Certain electric circuits such as those used in computers may comprise a number of small physically-independent units connected by plug and socket, or similar means to other circuits. Such units may include a thermionic valve and/or semi-conductor valve together with components and associated circuitry which may be printed on electrically insulating plaftorms. The advantages of having physically-independent units is that they may be easily replaced and serviced and also afford a high component packing factor and economical production costs.

The present invention is concerned with units of the type described below and which are sometimes referred to as circuit modules. Broadly, the unit may be described as comprising one or more circular platforms of electrical insulating material on which, or between which, are mounted electrical components having wire leads.

According to one aspect of the present invention there is provided an apparatus for affixing the wire leads of a plurality of electric components to a substantially circular platform, which comprises at least one supply station containing the components to be affixed, a support for rotatably supporting the platform, means to rotate the supported platform relative to the supply station, a feed member for carrying a component from the supply station to the platform with a wire lead adjacent the periphery of the platform, affixing means for affixing the wire lead adjacent the platform to the periphery of the platform to cause at least temporary union therewith and control means for controlling the relative operation of the rotation means and the feed member to ensure that the components are affixed at predetermined peripheral positions to the platform.

According to a second aspect of the present invention there is provided a method of affixing the wire leads of a plurality of electric components to a substantially circular platform comprising supporting the platform on a support, rotating the platform relative to a supply station containing the components to be affixed, carrying a component from the supply station to the platform with the aid of a feed member so that a wire lead of the component is adjacent the periphery of the platform, affixing the wire lead adjacent the platform to the periphery of the platform with the aid of affixing means to cause at least temporary union between the component and the platform, and turning the platform relative to the supply station before similarly affixing a further component, and controlling the relative operation of the rotation means and the feed member to ensure that the components are affixed at predetermined peripheral positions to the platform.

A feature of the apparatus according to the invention, is in that it may comprise means rotatably to support a second substantially circular platform, the second platform being of substantially equal size and supported in a spaced, parallel and coaxial position relatively to the first platform, and means to rotate both platforms in unison, the feed member being adapted to carry a component from the supply station to the platforms with a wire lead adjacent the periphery of each platform and the affixing means being adapted to affix the wire terminals adjacent the platforms to the peripheries of the adjacent platforms to cause at least temporary unions therewith.

According to a further feature of the apparatus according to this invention the means for feeding and affixing the component leads may be adapted so that the component itself is affixed in a position inset from the periphery of the platforms. This will readily permit the use of a soldering bath for soldering the wire lead to the periphery of the platform; the apparatus may therefore include a still further feature in that one or more soldering baths are provided so that the periphery of the platform having a component lead affixed thereto, may dip into the solder bath.

One embodiment of the present invention will now be described with reference to FIGURES 1 and 2 of the diagrammatic drawings in which.

Figures 1, 2:
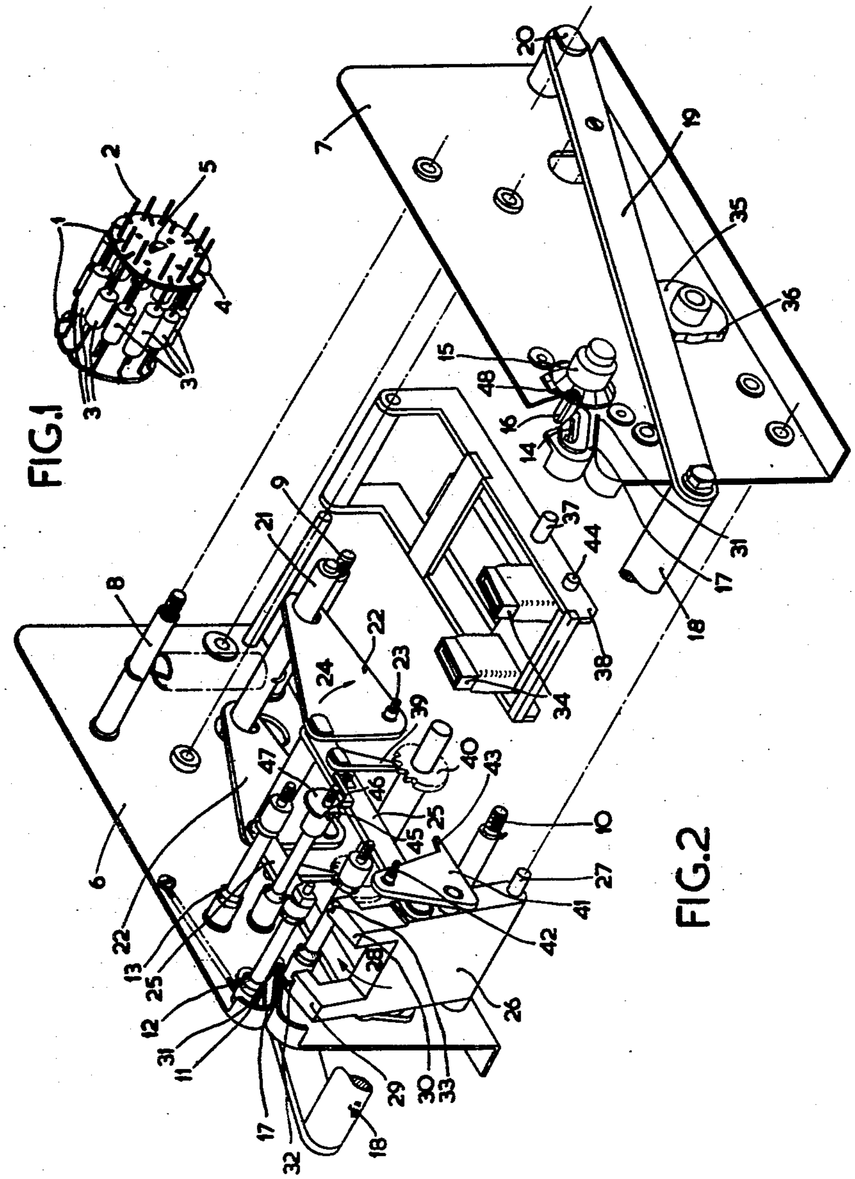
FIGURE 1 is a perspective view of a circuit module of the type suitable for employing automatic mounting and soldering of electronic components thereto.
FIGURE 2 is a perspective, exploded view of an automatic apparatus adapted for hand operation that will mount and solder components in a circuit module.

In FIGURE 1, the insulated platforms onto which may be added a printed circuitry, are designated by 1, one end of which is provided with a number of contact pins 2 arranged for connection to the external circuitry. Electronic components 3 are located around the periphery by means of notches 4. One of the end platforms also provided with a D shaped locating guide 5.

In FIGURE 2 the apparatus for mounting and soldering the components in a module has two side plates 6 and 7 separated by stringers 8, 9 and 10. The module to which components are to be mounted and soldered is inserted between rollers 11, 12 and 13, roller 11 being spring loaded in order to permit insertion of the module which may be held back by means of a hook aperture 14. The inserted module is keyed relative to a locating indicator 15 by means of a flat machined on shaft 16 co-acting with the D shaped locating guide 5 shown in FIGURE 1. A component having wire leads is inserted into the component guide 17 which brings the component adjacent to the selected terminal on the periphery of the module platform. Depression of hand lever 18 will swing an operating arm 19 about its pivot point 20 and impart a downward movement against a spring loading operating bar 21. This downward movement of the operating bar 21 will displace an operating link 22 which is pivoted about the side plates 6 and 7 by pivoting means 23 and follows the direction of arrow 24 causing a coupling link 25 to act on a forming arm 26 which is pivoted relative to the side plates 6 and 7 pivoting means 27. The movement of the forming arm 26 in the direction of arrow 28 causes the outer frontal edges of two projecting crimping arms 29 and 30 to shear the component's leads against a stop 31 in the component guide means 17. Continued travel of the crimping arms 29 and 30 forces wire leads of the component into the notches 4 (FIGURE 1 of the module). Jaws 32 and 33 on the crimping arms 29 and 30 are adapted to receive the thickness of the modules platform and firmly crimp the wire leads of the component in a position inset relative to the outer periphery of the module's platform.

In order that the soldering operation is not started before a component has been mounted and is in position ready for soldering the lifting motion imparted to soldering baths 34 is selected at the correct moment by use of a cam 35 having a suitable dwell period 36 and permits the initial component to reach the soldering position without soldering the vacant component terminals.

Rotation of the cam 35 is effected by pawl 39 engaging a ratchet wheel 40, the final soldering operation being carried by the depression of hand lever 18 so that the forward pivoting motion of the forming arm 26 rotates a lifting link 41 about its pivot 42 and swings the lifting hook 43 under a stud 44 on the side of the soldering baths support 38. This final lifting motion of the soldering baths is sufficient to immerse the already-crimped terminals of the component to the module in molten solder and the subsequent release of the operating handle 18 lowers the soldering baths support 38 by the downward travel of the lifting hook 43.

Rotation of the module about rollers 11, 12 and 13 is effected by means of a spring control pawl 46 attached to the coupling link 25 engaging a ratchet wheel 45, which in turn transmits a rotary motion via gear wheels 47 and 48 to the D sectional locating shaft 16. The ratchet wheel 45 is so proportioned that, for each release of the hand lever 18 after depression gives an angular displacement equal to that of one peripheral terminal of the module.

A complete operation for mounting and soldering components in a module will now be explained with reference to the above-described apparatus.

To insert the module the apparatus is set so that its locating indicator 15 indicates the first position, at which position cam 35 is at the beginning of its dwell 36.

Roller 11 is then pulled back and hooked against guide 14. The module is placed against rollers 12 and 13 and ensured that it is made to key with its locating guide 5 and the D shaft 16. The roller 11 is then released and takes up a third mounting position around the periphery of the module's platforms. A component having wire leads and which is desired to take up a first position, which for reference is related to the modules locating guide 5, is inserted into the component guiding means 17. The operating handle 18 is depressed so that the outer forward edges of the crimping arms 29 and 30 shear the components' leads away from the component guide means stop 31, and cut-outs 32 and 33 enter the modules platform and force the wire terminals into the notches 4 on the module platform. The operation is then repeated with further components which are programmed to be mounted across the appropriate module terminals. When the initial component has proceeded to some predetermined angle of rotation the soldering baths 34 are raised by the cam 35 so that the lifting stud 44 is brougnt over the lifting link hook 43 and in the following depression of the operating lever 18 the lifting link hook 43 raises the soldering baths 34 and the crimped connection is immersed in molten solder; subsequent release of the operating lever 18 lowers the soldering baths and the bath support 38 assumes a mid-position on the cam 35. After the mounting of the last component the soldering operation is carried on until the last component reaches the soldering operation and the module is then removed and the apparatus is ready to be used again.

Although the present invention has been described with reference to hand operation it is to be understood that it is not solely limited to this mode of operation, and that complete automaic operation, whereby the modules and components are fed and ejected automatically from a magazine, can be envisaged. The components could be programmed by loading the magazines into the required order or alternatively a number of magazines, one for each component value, could be mounted on a turret and arranged to present the appropriate component to the component guide means of an apparatus as herein before described.

What is claimed is:

1. An apparatus for affixing the opposite, axial wire leads of a plurality of electric components to a pair of spaced, notched substantially circular support plates comprising
   (*a*) a pair of spaced side plates,
   (*b*) at least one supply station for containing said components to be affixed to said support plates including wire end clamping means mounted on said side plates,
   (*c*) a support structure on said side plates and including roller means for rotatably supporting said support plates relative to said supply station,
   (*d*) a pivoting feed member provided with a handle operated externally of the apparatus for transporting one of said electric components from said supply station to a position adjacent to the periphery of said support plates and with said wire ends over selected notches,
   (*e*) and means provided on said feed member for inserting said wire ends of the electrical components in selected notches of said support plates and separate means for bending the ends of said wire leads into engagement with and in positions substantially parallel to said support plates.

2. An apparatus for affixing the opposite, axial wire leads of a plurality of electric components to a pair of spaced, substantially circular and similar and notched support plates comprising
   (*a*) a pair of spaced side plates,
   (*b*) at least one supply station for containing said components to be affixed to said support plates including wire end means mounted on said side plates,
   (*c*) a support structure on said side plates and including roller means for rotatably supporting said support plates relative to said supply station,
   (*d*) a pivoting feed member provided with a handle operated externally of the apparatus for transporting one of said electric components from said supply station to a position adjacent to the periphery of said support plates and with said wire ends over selected notches,
   (*e*) and means on said feed member for inserting said wire ends of said electrical components in selected notches of said spaced support plates and separate means for bending the wire ends on either side of the portion in said notches into engagement with and in a position substantially parallel to said support plates.

3. An apparatus for affixing the opposite, axial wire leads of a plurality of electric components to a pair of spaced, substantially circular and similar and notched supporting plates as claimed in claim 2 wherein said pivoting feed member is provided with crimping arms which are adapted to crimp the wire leads into their corresponding notches to form a module.

4. An apparatus for affixing the opposite, axial wire leads of a plurality of electric components to a pair of spaced, substantially circular and similar and notched support plates as claimed in claim 2 further comprising a means for rotating said spaced notched plates intermittently to index the same.

5. An apparatus for affixing the opposite, axial wire leads of a plurality of electric components to a pair of spaced, substantially circular, notched support plates comprising
   (*a*) a pair of spaced side plates,
   (*b*) at least one supply station for containing said components to be affixed to said support plates including wire end clamping means mounted on said side plates,
   (*c*) a support structure on said side plates and including roller means for rotatably supporting said support plates relative to said supply station,
   (*d*) a pivoting feed member provided with a handle operated externally of the apparatus for transporting one of said electric components from said supply station to a position adjacent to the periphery of said support plates and with said wire ends over selected notches,
   (*e*) means provided on said feed member for inserting said wire ends of the electrical components in selected notches of said support plates and separate means for bending the ends of said wire leads into engagement with and in a position substantially parallel to said support plates, (*f*) and a molten solder bath for each notched support plate, and means for selectively moving said bath about an axis parallel to the axis of said support plates and into a position into engagement with the peripheries and the notches of said spaced plates to thereby dip solder said leads to said support plates.

6. An apparatus for affixing the opposite, axial wire leads of a plurality of electric components to a pair of spaced, notched, substantially circular support plates comprising (*a*) a pair of spaced side plates, (*b*) at least one supply station for containing said components to be affixed to said support plates including wire end clamping means mounted on said side plates, (*c*) a support structure on said side plates and including roller means for rotatably supporting said support plates relative to said supply station, (*d*) a pivoting feed member provided with a handle operated externally of the apparatus for transporting one of said electric components from said supply station to a position adjacent to the periphery of said support plates and with said wire ends over selected notches, (*e*) means provided on said feed member for inserting said wire ends of the electrical components in selected notches of said support plates and separate means for bending the ends of said wire leads into engagement with and in positions substantially parallel to said support plates, (*f*) a molten solder bath for each notched support plate, (*g*) means for selectively moving said bath about an axis parallel to the axis of said support plates and into a position into engagement with the peripheries and the notches of said spaced plates to thereby dip solder said leads to said support plates, (*h*) means for rotating said spaced notched plates intermittently to index the same, said rotating means comprising a pawl operatively connected to said feed member and co-acting ratchet wheel operatively connected to said notched support plates, (*i*) and means operatively connected to said feed member for moving said bath toward said support plates to dip-solder each of the leads of components affixed in the notches of said support plates during the period said support plates are at rest, (*j*) said external handle means moving the solder bath away from the support plates after the soldering operation is completed.

References Cited in the file of this patent

UNITED STATES PATENTS

| | | |
|---|---|---|
| 2,115,367 | Levy et al. | Apr. 26, 1938 |
| 2,651,830 | Wilken et al. | Sept. 15, 1953 |
| 2,699,133 | Ames et al. | Jan. 11, 1955 |
| 2,770,875 | Zimmerman | Nov. 20, 1956 |
| 2,771,048 | Zimmerman | Nov. 20, 1956 |
| 2,771,663 | Henry | Nov. 27, 1956 |
| 2,772,416 | Dorosz et al. | Dec. 4, 1956 |
| 2,835,962 | Tally et al. | May 27, 1958 |
| 2,871,548 | Pisani | Feb. 3, 1959 |
| 2,871,549 | Arnold | Feb. 3, 1959 |
| 2,879,585 | Petersen | Mar. 31, 1959 |
| 2,927,251 | Jones et al. | Mar. 1, 1960 |
| 2,929,964 | Rhys-Jones | Mar. 22, 1960 |
| 2,934,814 | Williams et al. | May 3, 1960 |
| 2,964,007 | Buffington | Dec. 13, 1960 |